Oct. 10, 1967 — J. T. WLOSZEK — 3,346,130
TUBE CENTERING CONVEYOR
Filed Sept. 8, 1965 — 3 Sheets-Sheet 2
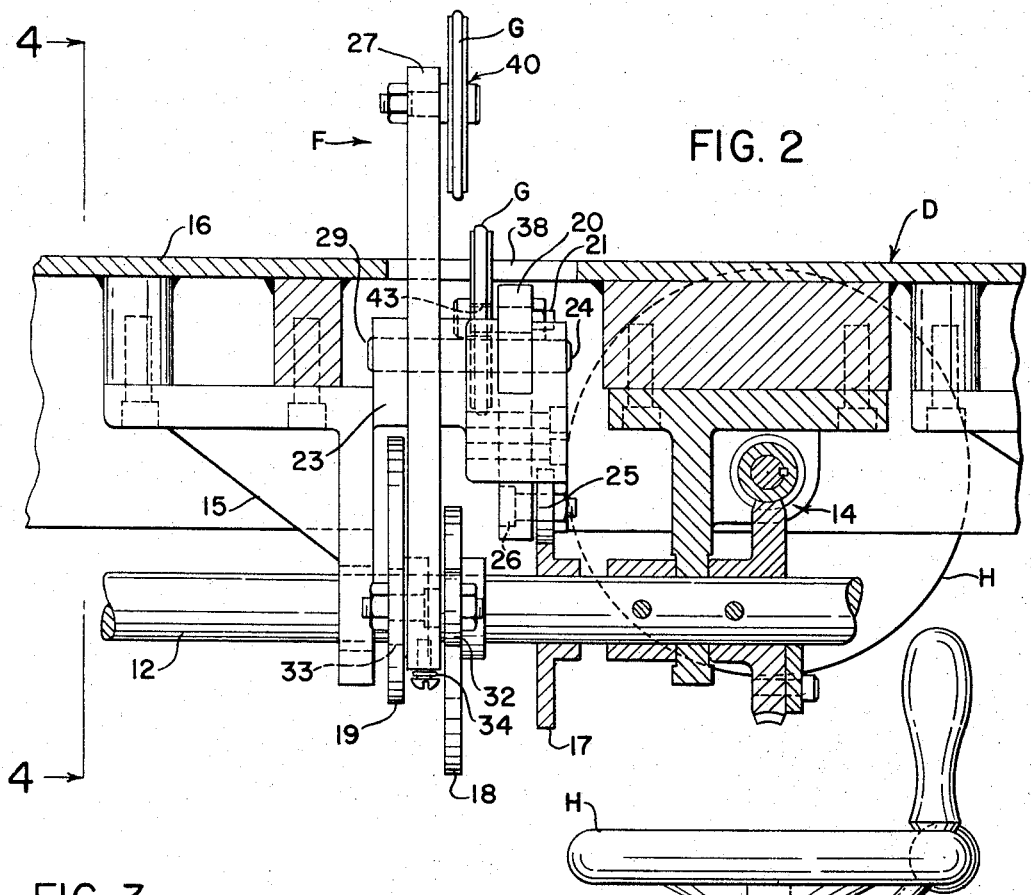
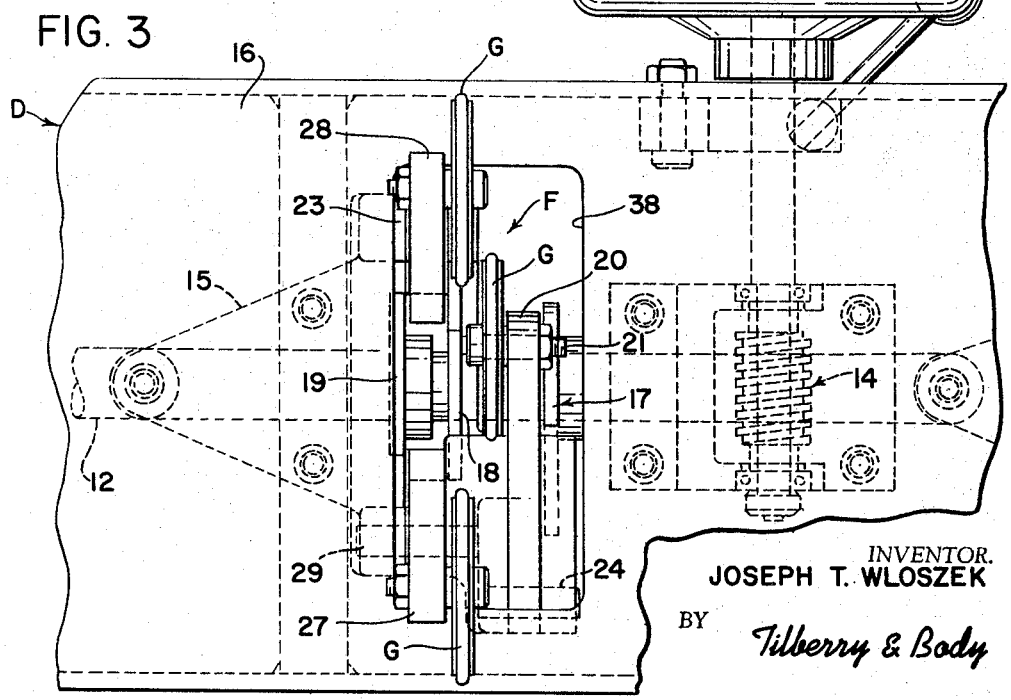
INVENTOR.
JOSEPH T. WLOSZEK
BY Tilberry & Body
ATTORNEYS Oct. 10, 1967  J. T. WLOSZEK  3,346,130
TUBE CENTERING CONVEYOR Filed Sept. 8, 1965  3 Sheets-Sheet 3

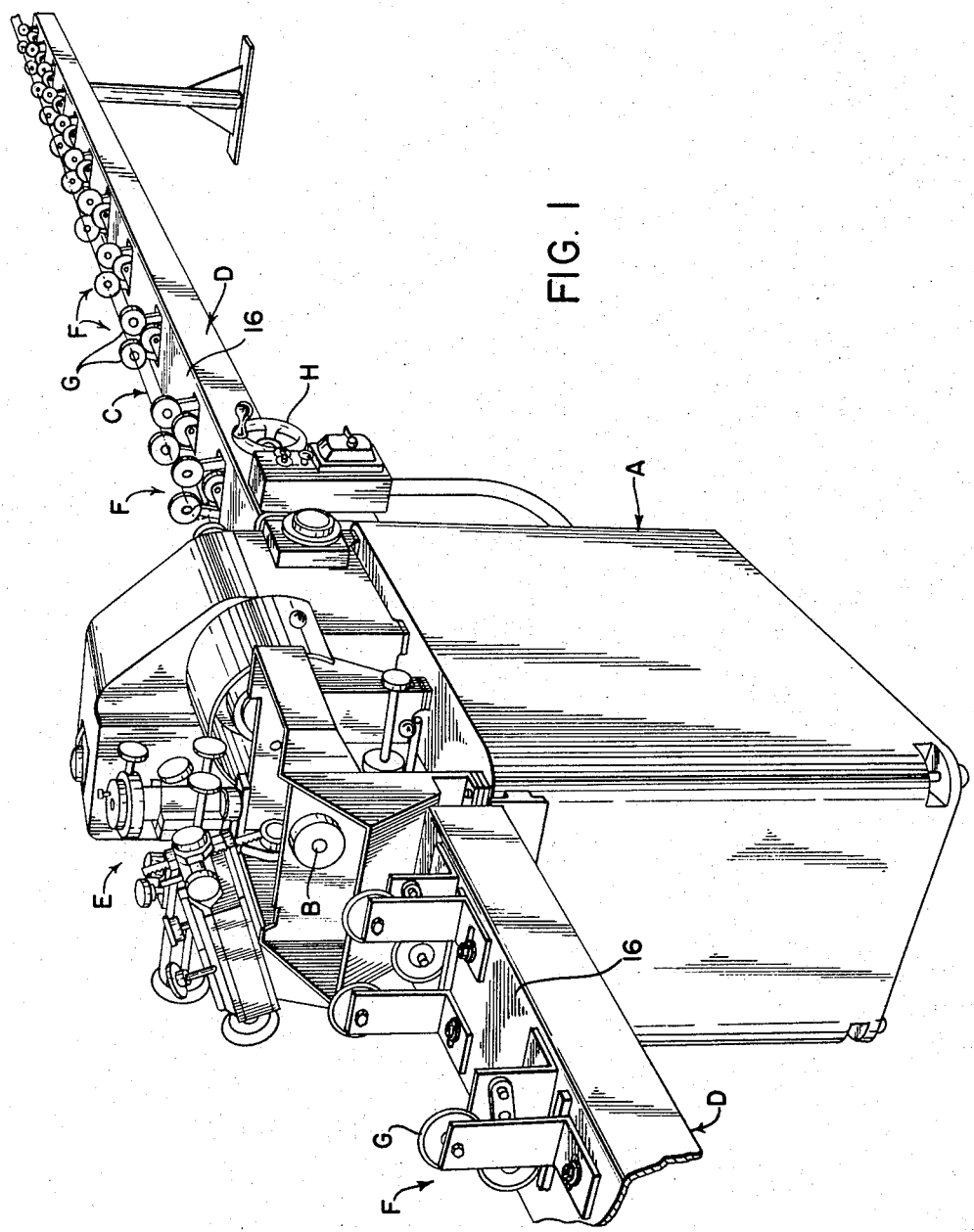

INVENTOR.
JOSEPH T. WLOSZEK
BY
Tilberry & Body

ATTORNEYS

United States Patent Office 3,346,130
Patented Oct. 10, 1967

3,346,130
TUBE CENTERING CONVEYOR
Joseph Thomas Wloszek, Seven Hills, Ohio
(9200 George Ave., Cleveland, Ohio 44105)
Filed Sept. 8, 1965, Ser. No. 485,864
13 Claims. (Cl. 214—339)

This invention pertains to the art of work feeding mechanisms and, more particularly, to a conveyor employing rolls made adjustable toward and from a common point of center.

The invention will be described with particular reference to a tube centering conveyor for an ultrasonic testing machine; however, it should be appreciated that it has much broader applications and may be used for round bars and rods or wherever it is desirable to feed shafting, whether of a small or large size, through and beyond a tool on a given axis of advance.

It is found that in the practice of feeding rods, bars, tubing, or the like, of various diameters there is a problem of centering the workpiece on a given axis of advance directed toward the tool. One example is the case of an ultrasonic tube tester where the manufactured article must be inspected on all surfaces. This requires that each tube, whether large or small in diameter, be rotated while being advanced beneath a sensitive ultrasonic probe. The feeding axis is therefore one of the parameters affecting the accuracy of the test machine. The advancing and rotating tube must be manipulated with precision so that its center will coincide with the work center of the tool in order to preserve test accuracy.

Known tube conveyors with a center manipulating capacity employ circumferentially spaced rolls which engage the surface of the tube and establish a center by moving radially toward or away from the work center in accordance with the tube size being handled. This arrangement has as one disadvantage the fact that the tube must be threaded through the opening between the rolls. A complicated radial gear mechanism is required to shift some rolls radially inwardly and others radially outwardly to establish the proper center. In addition to aligning the tube with the tool center, such conveyors feed the tube and in order that they may do so it is necessary that the roll axes be arranged obliquely to the tube axis of advance. Making sure that each roll is set at the proper inclination is obviously a difficult and tedious operation.

These and other difficulties are overcome with the present invention which provides for centering and feeding a tubular workpiece in which a plurality of tube manipulators are mutually adjustable by a common mechanism and are reliably and simply actuated to establish a precision work center regardless of the size of the tube.

In accordance with the invention, a tube conveyor is provided comprising a plurality of rolls positioned along each side of a tube having a common axis of rotation generally parallel to the tube axis and rotatably engaging its exterior surface at a point below its horizontal midplane so as to cradle the tube centrally therebetween and an adjusting mechanism connectable to the rolls for moving each in unison toward or away from the feeding axis so as to raise or lower the tube to coincide with such axis, each roll being loosely mounted so as to permit angulation of its rotational axis automatically in the direction of feed and in accordance with the helical rate of tube advance.

Further in accordance with the invention the adjusting mechanism includes a rotatable shaft extending lengthwise of the conveyor in the vertical plane containing the feeding axis, a cam lobe positioned on the shaft adjacent each roll and a linkage pivoted below each roll including a cam follower engageable with the respective cam lobe for moving each roll in a plane generally perpendicular to the tube axis so as to raise or lower the tube to coincide with the feeding axis.

The principal object of the invention is to provide a tube centering conveyor which may be adjusted throughout its length from a single location by virtue of a common adjusting mechanism.

Another object of the invention is to provide a conveyor arranged so as to cradle the tube in a series of roll clusters each being manipulated from a common adjusting mechanism.

Another object is to provide a conveyor which permits the workpiece to be lowered onto the conveyor from an overhead position.

Another object of the invention is to provide an adjusting mechanism employing cam lobes and cam followers associated with each roll cluster whereby the roll movement toward or away from the work center is in accordance with a programmed function prescribed by the configuration of the camming surfaces.

Another object is to provide a conveyor which compensates for variation in feeding rate by automatically varying the obliquity of the rolls.

These and other objects will become apparent by reference to the following description and drawings wherein:

FIGURE 1 is a perspective view of an ultrasonic tube testing machine employing a linear tube centering conveyor constructed in accordance with the invention;

FIGURE 2 is a longitudinal sectional view of a tube manipulator roll cluster assembly shown in the position to receive the largest diameter tube which the testing machine of FIGURE 1 is designed to accept;

FIGURE 3 is a plan view of the roll cluster assembly shown in FIGURE 2; and,

Figure 4:
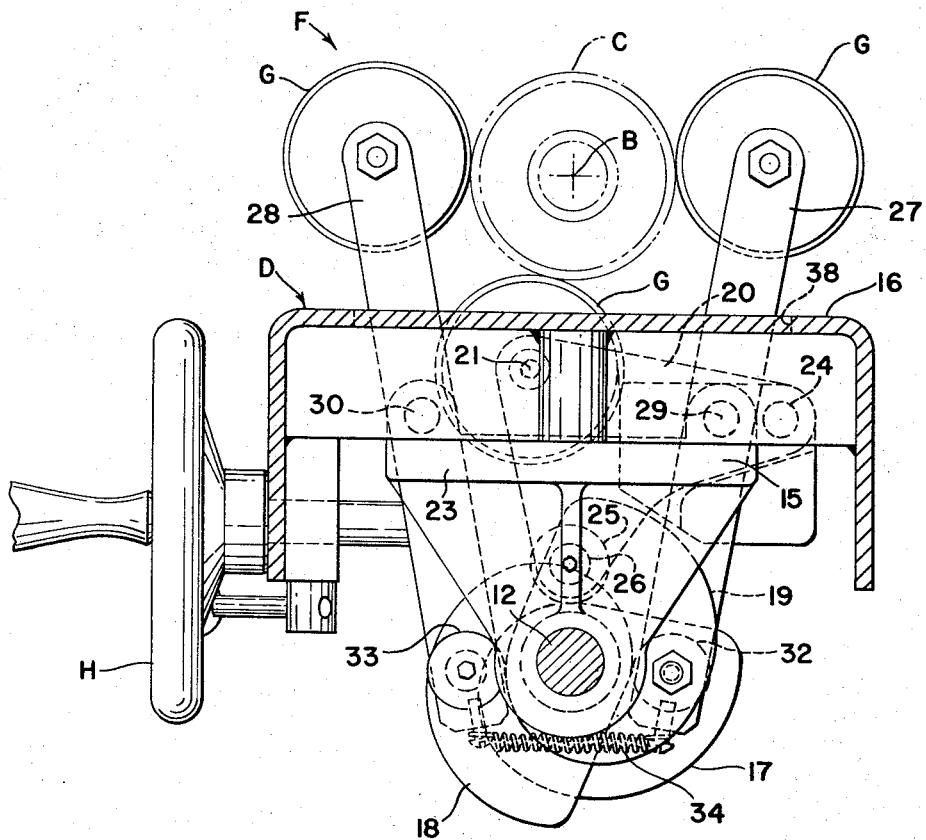
FIGURE 4 is a cross sectional view of the roll cluster assembly taken along line 4—4 of FIGURE 2.

Referring now to the drawings wherein the figures are for the purpose of illustrating a preferred embodiment of the invention only and not for the purpose of limiting same, FIGURE 1 is exemplary of the invention as used with an ultrasonic tube tester A having a work center B establishing the axis of advance for a tube C approaching on a conveyor D. In the application shown, the conveyor D, constructed in accordance with the invention, is effective for manipulating the vertical position of the tube C so that its actual center coincides with the work center B as determined by the position of an ultrasonic probe indicated generally at E.

In the case of the machine A, the tube C is advanced and rotated by the machine A at a rate sufficient to expose all areas of the tube to the sensitive probe E in a manner to accomplish the requisite ultrasonic testing. Of course, if the tool with which the invention is being used is not capable of advancing and rotating the workpiece, then any known device may be associated with the conveyor D for delivering the workpiece to the tool, or the conveyor D may itself be modified in a known manner to rotate and feed the workpiece. Generally it will be desirable to feed the tube at a uniform rate of advance regardless of tube size, thus the rotation speed will vary in accordance with tube diameters. In the preferred embodiment of the invention, the conveyor D comprises a linear series of tube manipulator roll clusters F, each having a plurality of rolls G arranged in a generally triangular array for cradling the tube C, as shown in FIGURES 1 and 4. Each roll G has a common rotational axis with the respective roll G in each cluster F, which axis extends generally parallel to the work center B and the tube axis. However because it is necessary to inch the tube forwardly more or less continuously in conducting the test, the rolls must be capable of a degree of angulation on their axes as will be explained hereinafter.

As provided by the invention, the rolls G are moved toward or away from the work center B by an actuating mechanism which is operated from a single location near the machine A by hand wheel H. Referring now to FIGURES 2 through 4, the actuating mechanism includes a rotatable shaft 12 which extends lengthwise of the conveyor D and lies in a vertical plane containing the tube axis and work center B. Depending upon the direction of rotation of handle H, a worm and screw arrangement 14 is operated to rotate the shaft 12 in a clockwise or counterclockwise direction on the bearing brackets 15 which support the shaft 12 from the conveyor frame 16. Cam lobes 17, 18, 19 are fixed on the shaft 12 for rotation therewith and are arranged in sets of three below each cluster F of rolls G to control the extent to which each roll G is moved inwardly or outwardly with respect to the work center B. As best seen in FIGURES 2 and 4, the bottom roll G is rotatably mounted on a bell crank 20 at 21 which is pivoted at 24 on a rearward extension 23 of the bearing bracket 15. A cam follower 25 is rotatably mounted on one corner of the bell crank 20 at 26 for continuous rolling engagement with the camming surface of the cam lobe 17. The majority of the weight of tube C is transmitted to the conveyor frame 16 through the bottom roll G, bell crank 20 and connected structure. Cam lobes 18, 19 have the same configuration as cam lobe 17 and are set on shaft 12 approximately 180° out of phase with respect to each other and approximately 90° out of phase with cam lobe 17, as shown in FIGURE 4, which arrangement prescribes movement of right and left hand rolls G in opposite directions toward and from the work center B. Right and left hand rolls G are rotatably mounted on the upper ends of levers 27, 28, respectively, and each lever is pivoted near the middle at 29, 30 to the rearward extension 23. Cam followers 32, 33 are pivoted on the lower ends of levers 27, 28 and are biased by coil spring 34 into engagement with the associated cam lobes 18, 19.

As shown, each cluster F is in the fully lowered position, meaning that the conveyor D is ready to receive a tube C of the largest diameter which can be accommodated by the machine A. In this position, the right, left and bottom rolls G are moved outwardly to the widest possible position with respect to the work center B which means that the cam followers 25, 32, 33 rest on the flat portions of the cam lobes 17, 18, 19. When a tube of smaller diameter is to be tested by the machine A, hand wheel H is rotated causing shaft 12 to turn in a clockwise direction, as viewed in FIGURE 4. This rotates all of the cam lobes 17, 18, 19 along the shaft 12 in unison. Cam lobes 18, 19 push in opposite directions against the force of spring 34 on cam followers 32, 33 causing levers 27, 28 to swing about pivots 29, 30 moving the right and left rolls G of each cluster F in an arcuate path inwardly toward the center B by equal distances. At the same time, cam lobe 17 lifts the bell crank 20 swinging the bottom roll G of each cluster F upwardly through opening 38 and about the pivot 24 toward the work center B in an arc equal to that traversed by the right and left hand rolls G. Of course, rotation of handle H in the opposite direction will have an opposite effect.

The separate rolls G in each cluster F move toward or away from the work center B in unison to form a cradle-like support for the tube C which is adjustable so as to raise or lower the tube C in a vertical plane whereby its axis will be brought to coincide with the work center B. In addition the rolls G have a second degree of movement. As the tube is rotated it is also being fed at a slow rate by the advancing mechanism of machine A. The rate of feed may be only a few inches per minute. Also, at times it is desirable to back the tube up or hold it against axial movement while rotating as test procedures require. Hence it is necessary to incline the axis of each roll G toward the feeding axis in response to the rate and direction of feed. In accordance with the invention the degree and direction of inclination of the rotational axis of each roll G is automatically responsive to the tube feeding rate and direction of advance by virtue of a loose mounting 40 of each roll G on its shaft 42. As seen in FIGURES 2 and 3, for example, the center hole 43 of each roll G is slightly larger than the diameter of shaft 42 which permits the rolls to angle inwardly toward the feeding axis in a plane generally parallel to the pitch of the helically advancing tube.

Thus, it will be appreciated that in the preferred embodiment of the invention, each roll G has a programmed motion prescribed by the conguration of the curved camming surface of the associated cam lobe, and that by varying cam configuration or angular disposition on the shaft, a wide range of tube sizes may be accommodated. Moreover, with the arrangement contemplated by the invention, each roll is capable of a slight angular adjustment relative to the feeding axis uniformly in response to the helical rate of advance. In addition, a tube that is to be tested is merely lowered onto the conveyor D from an overhead position due to the cradle-like support thus taking advantage of overhead cranes and other work saving equipment. Another advantage is that the operator of the machine A can also perform the aligning function from his position in front of the machine which is within easy reach of the hand wheel H.

Having now described a preferred embodiment of the invention and its operation, it will be understood that various modifications may be made by persons skilled in the art without deviating from the invention as defined in the appended claims.

What is claimed is:

1. A work centering device comprising:
   a plurality of manipulator members one positioned on each side of a symmetrical workpiece rotatably engaging its exterior surface at a point below its midplane so as to cradle the workpiece centrally therebetween and
   an adjusting means connectable to the manipulator members for moving each in unison toward or away from a predetermined work center so as to raise or lower the workpiece until its axis of symmetry coincides with such work center including:
      a rotatable shaft extending parallel to the workpiece axis of symmetry and work center,
      camming means rotatable by the shaft for controlling movement of each manipulator member toward and away from said work center, and
      cam follower means connected to each manipulator member for transmitting movement of the camming means.

2. A work centering device as set forth in claim 1 comprising in addition a third manipulator member positioned below the workpiece and said adjusting means comprising:
   a rotatable shaft extending in a vertical plane containing said workpiece axis of symmetry and work center,
   camming means positioned on the shaft for controlling movement of each manipulator member, and
   a linkage including a cam follower for transmitting movement of the camming means to each manipulator member.

3. A work centering device as set forth in claim 2 wherein the rotational axis of each manipulator member is inclinable toward the work center in the direction of movement of the workpiece.

4. A work centering device as set forth in claim 3 where the workpiece is tubular having a circular cross-section, the adjusting means comprises:
   a three cornered crank member carrying the bottom manipulator member at the upper corner, a cam follower at the lower corner and being pivoted at the third corner,
   a lever arm carrying each side manipulator member at its upper end having a cam follower mounted on its lower end and being pivoted adjacent its midpoint, spring means biasing the lower ends of said lever arms inwardly, and separate cam lobes positioned on the shaft being engageable with a respective cam follower whereby rotation of the shaft causes movement of each manipulator member along an arcuate path the length of which is determined by the configuration of the respective cam lobe.

5. A work centering device as set forth in claim 4 wherein each cam lobe is identically configured so as to move each manipulator member through equal arcuate distances.

6. A work centering device as set forth in claim 5 wherein the cam lobes for the two side manipulator members are about 180° out of phase and the remaining cam lobe is approximately 90° out of phase with the other two so that the manipulator members move in unison.

7. A conveyor for tubes of various sizes comprising a plurality of roll clusters arranged in a series substantially the length of a tube to be delivered to a tool having a fixed work center, each roll cluster comprising:
   a roll positioned on each side of the tube rotatably engaging its exterior surface at a point below its midplane so as to cradle the tube centrally therebetween and
   an adjusting means common to each roll cluster connectable to each roll for moving each in unison toward or away from said work center so as to raise or lower the tube until its axis coincides with such work center including:
      a rotatable shaft extending in a vertical plane containing said tube axis and work center,
      camming means associated with each roll cluster rotatable by the shaft for controlling movement of each roll toward and away from said work center, and
      cam follower means connected to each roll for transmitting movement of the camming means.

8. A conveyor as set forth in claim 7 wherein the rotational axis of each roll is inclinable toward the work center in the direction of movement of the tube.

9. A conveyor as set forth in claim 8 comprising in addition a third roll in each cluster positioned below the tube and said adjusting means comprising:
   a rotatable shaft extending lengthwise of the conveyor in said vertical plane parallel to the tube axis and work center,
   camming means positioned on the shaft below each roll cluster for uniformly controlling the movement of each roll, and
   a linkage including a cam follower for transmitting movement of the camming means to the associated roll.

10. A conveyor as set forth in claim 9 wherein the adjusting means comprises:
    a three cornered crank member carrying the bottom roll at the upper corner, a cam follower at the lower corner and being pivoted at the third corner,
    a lever arm carrying each side roll at its upper end having a cam follower mounted at its lower end and being pivoted adjacent its midpoint,
    spring means biasing the lower ends of said lever arms inwardly, and
    cam lobes positioned on the shaft below each roll cluster being engageable with a respective cam follower whereby rotation of the shaft causes each roll to move in unison in an arcuate path the length of which is determined by the configuration of the respective cam lobes.

11. A conveyor as set forth in claim 10 wherein each roll is loosely mounted on its rotational axis to permit a slight angulation toward the work center in either direction depending on the direction and date of feed of said tube.

12. A conveyor as set forth in claim 10 wherein the cam lobes for the two side rolls are about 180° out of phase and the third cam lobe is approximately 90° out of phase with the other two.

13. A conveyor as set forth in claim 10 wherein each cam lobe is identically configured so as to move each roll through equal arcuate distances.

References Cited
UNITED STATES PATENTS

| | | | |
|---|---|---|---|
| 711,851 | 10/1902 | Hanson | 214—338 |
| 1,740,430 | 12/1929 | Mudd | 214—338 |
| 2,165,097 | 7/1939 | Fuller | 214—339 X |
| 2,177,054 | 10/1939 | Catini | 214—338 X |
| 3,091,900 | 6/1963 | Whittenberg | 214—339 X |

HUGO O. SCHULZ, *Primary Examiner.*

MARVIN A. CHAMPION, *Assistant Examiner.*